(12) United States Patent
Sawada et al.

(10) Patent No.: US 8,625,102 B2
(45) Date of Patent: Jan. 7, 2014

(54) ABERRATION MEASUREMENT METHOD AND SYSTEM INCLUDING INTERFEROMETER AND SIGNAL PROCESSING UNIT

(75) Inventors: Yasuhiro Sawada, Tokyo (JP); Satoru Komatsu, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 493 days.

(21) Appl. No.: 12/961,664

(22) Filed: Dec. 7, 2010

(65) Prior Publication Data

US 2011/0135145 A1    Jun. 9, 2011

(30) Foreign Application Priority Data

Dec. 7, 2009    (JP) ................................. 2009-277157

(51) Int. Cl.
*G01B 9/02*    (2006.01)

(52) U.S. Cl.
USPC ........................................................ 356/495

(58) Field of Classification Search
USPC ........................................................ 356/495
See application file for complete search history.

(56) References Cited

U.S. PATENT DOCUMENTS

| 5,694,217 | A | 12/1997 | Hizuka | |
| 6,816,261 | B2 * | 11/2004 | Patel et al. | 356/365 |
| 2008/0273200 | A1 * | 11/2008 | Kakuchi et al. | 356/364 |
| 2008/0291463 | A1 * | 11/2008 | Milner et al. | 356/491 |

FOREIGN PATENT DOCUMENTS

| JP | 02-116732 A | 5/1990 |
| JP | 3209390 B2 | 9/2001 |

* cited by examiner

*Primary Examiner* — Tara S Pajoohi Gomez
*Assistant Examiner* — Jonathon Cook
(74) *Attorney, Agent, or Firm* — Rossi, Kimms & McDowell LLP

(57) ABSTRACT

An aberration measurement system includes an interferometer that includes a polarization adjuster configured to adjust a polarization plane of coherent light, and a phase shifter configured to shift a phase of reference light. The aberration measurement system further includes a signal processing unit configured to obtain a nonpolarization aberration of the test object, and coefficients $a = \sin \epsilon \cos 2\theta$, $b = \sin \epsilon \sin 2\theta$, and $c = \cos \epsilon$ for a retardation amount $2\epsilon$ and a principal axis direction $\theta$ of a polarization aberration of the test object, based on data of a plurality of interference pattern images which provide at least three complex visibilities obtained from the interferometer after a polarization adjuster adjusts the polarization plane of the coherent light, and to determine signs of the coefficients a, b, and c based on the nonpolarization aberration.

4 Claims, 7 Drawing Sheets

ABERRATION MEASUREMENT METHOD AND SYSTEM INCLUDING INTERFEROMETER AND SIGNAL PROCESSING UNIT

BACKGROUND OF THE INVENTION

1. Field of the Invention

The present invention relates to an aberration measurement system and an aberration measurement method.

2. Description of the Related Art

There is a demand for a highly precise measurement of a polarization aberration and a nonpolarization aberration of an optical element (test object). The polarization aberration is an aberrational component that is caused by birefringence and depends upon the polarization, and the nonpolarization aberration is a component that does not depend upon the polarization. In general, the interferometric measurement is usually used for the measurement of the nonpolarization aberration of the test object. On the other hand, Japanese Patent No. 3,209,390 proposes use of circularly polarized light for illumination light so as to measure the polarization aberration of the test object. Other prior art include Japanese Patent Laid-Open No. 2-116732.

However, even if the circularly polarized light is used as proposed in Japanese Patent No. 3,209,390, the retardation of the test object cannot be measured near an (integer+½)-th wavelength due to drops of the interference contrast (visibility). In addition, when the polarization aberration is expressed by the retardation and the principal axis direction, the quantitative understanding becomes difficult.

SUMMARY OF THE INVENTION

The present invention provides an aberration measurement system and an aberration measurement method which can highly precisely obtain both polarization and nonpolarization aberrations.

An aberration measurement system according to one aspect of the present invention includes an interferometer that includes a polarization adjuster configured to adjust a polarization plane of coherent light, and a phase shifter configured to shift a phase of reference light. The interferometer is configured to split the coherent light into the reference light and test light and to enable an interference pattern to be observed which is obtained by an interference between the reference light and the test light that has transmitted a test object. The aberration measurement system further includes a signal processing unit configured to obtain a nonpolarization aberration of the test object, and coefficients a=sin $\epsilon$ cos 2$\theta$, b=sin $\epsilon$ sin 2$\theta$, and c=cos $\epsilon$ for a retardation amount 2$\epsilon$ and a principal axis direction $\theta$ of a polarization aberration of the test object, based on data of a plurality of interference pattern images which provide at least three complex visibilities obtained from the interferometer after the polarization adjuster adjusts the polarization plane of the coherent light, and to determine signs of the coefficients a, b, and c based on the nonpolarization aberration.

An aberration measurement system according to another aspect of the present invention includes an interferometer that includes a polarization adjuster configured to adjust a polarization plane of coherent light, and a phase shifter configured to shift a phase of the coherent light. The interferometer is configured to enable an interference pattern to be observed which is obtained by an interference between the coherent light that has transmitted a test object and other coherent light that has a phase shifted by the phase shifter from that of the coherent light that has transmitted the test object. The aberration measurement system further includes a signal processing unit configured to obtain a nonpolarization aberration of the test object through an integration of data of a plurality of interference pattern images which provide at least three complex visibilities obtained from the interferometer after the polarization adjuster adjusts the polarization plane of the coherent light, and to obtain coefficients a=sin $\epsilon$ cos 2$\theta$, b=sin $\epsilon$ sin 2$\theta$, and c=cos $\epsilon$ through a superposition of an outer product of the data for a retardation amount 2$\epsilon$ and a principal axis direction $\theta$ of a polarization aberration of the test object.

Further features of the present invention will become apparent from the following description of exemplary embodiments with reference to the attached drawings.

DESCRIPTION OF THE EMBODIMENTS

Figure 1:
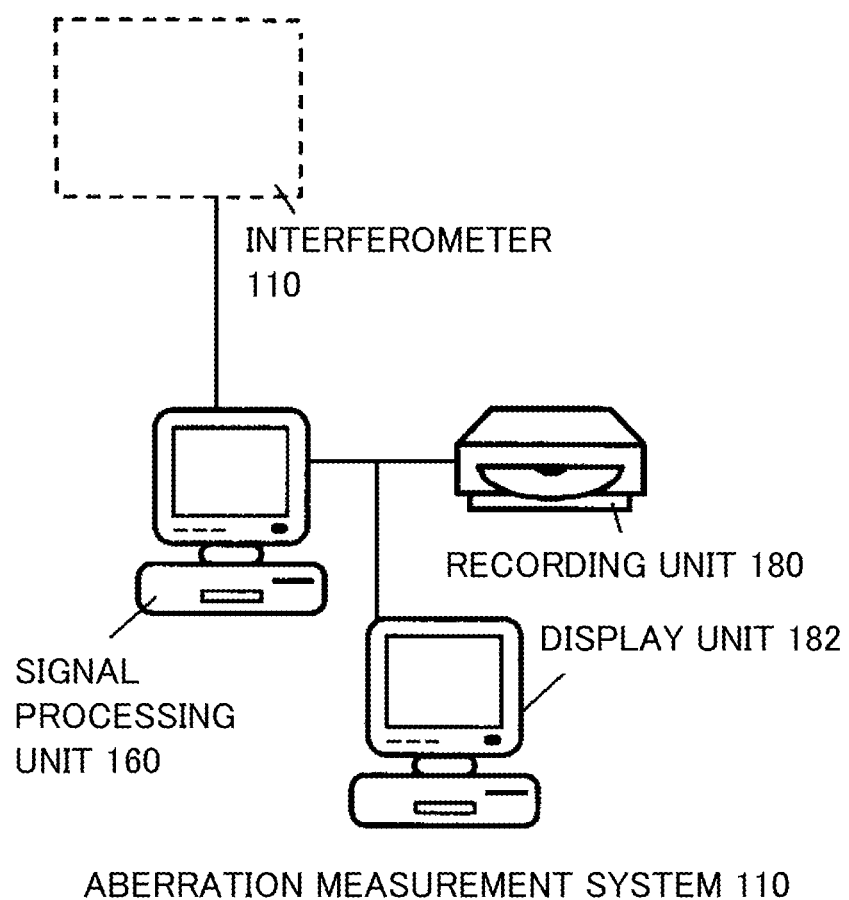
FIG. 1 is a block diagram of an aberration measurement system according to a first embodiment.

FIG. 1 is an aberration measurement system 100 according to this embodiment. The aberration measurement system 100 is a system configured to take an interference pattern image of a wavefront of a test object O using an interferometer 110, and to obtain an aberration, such as a nonpolarization aberration and a polarization aberration, of the test object O from the interference pattern.

The aberration measurement system 100 includes a two-beam interferometer 110, a signal processing unit 160, a recording unit 180, and a display unit 182.

Figure 6:
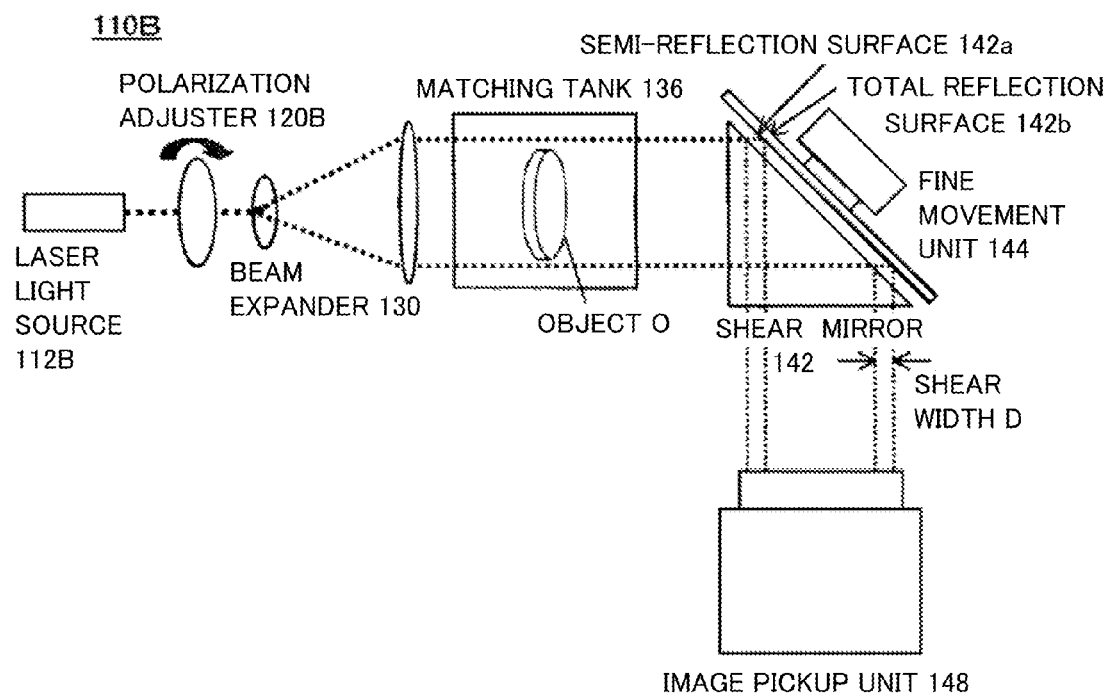
FIG. 6 is a block diagram of an interferometer according to a second embodiment.

The interferometer 110 is configured to split coherent light as illumination light having at least three types of polarization planes (polarization states) into reference light and test light, to superimpose the test light that has transmitted the test object O, such as a lens (optical element) with the reference light, and to enable an operator to observe an interference pattern. The interferometer 110 may use an interferometer 110A illustrated in FIG. 2 or an interferometer 110B illustrated in FIG. 6, as described later.

The signal processing unit 160 includes a personal computer ("PC") that includes a display unit and an input unit, and is configured to obtain both polarization and nonpolarization aberrations of the test object O utilizing data of the interference pattern image of the test object O taken by the interferometer 110. The signal processing unit 160 obtains the polarization aberration and the nonpolarization aberration based on data of a plurality of interference patterns which provide at least three complex visibilities derived from the interferometer 110 by changing a polarization plane of the coherent light.

The signal processing unit 160 stores a signal processing program in a memory, such as a hard disk drive ("HDD") (not illustrated) used for the signal processing unit 160 to generate the polarization aberration data and the nonpolarization aberration data of the test object O. The signal processing unit 160 performs a process illustrated in FIG. 4 when the interferometer 110A is used and a process illustrated in FIG. 7 when the interferometer 110B is used.

The recording unit 180 records the polarization aberration and the nonpolarization aberration generated by the signal processing unit 160. The recording unit 180 may be incorporated in the signal processing unit 160 such as a HDD, and constitute part of the signal processing unit 160.

The display unit 182 is configured to display coefficients {a, b, c} relating to the polarization aberration on a three-dimensional space that sets them to orthogonal axes. The display unit 182 is a display or a printer configured to submit the nonpolarization aberration generated by the signal processing unit 160. The display unit 182 may be part of the signal processing unit 160 as a display of the signal processing unit 160.

First Embodiment

Figure 2:
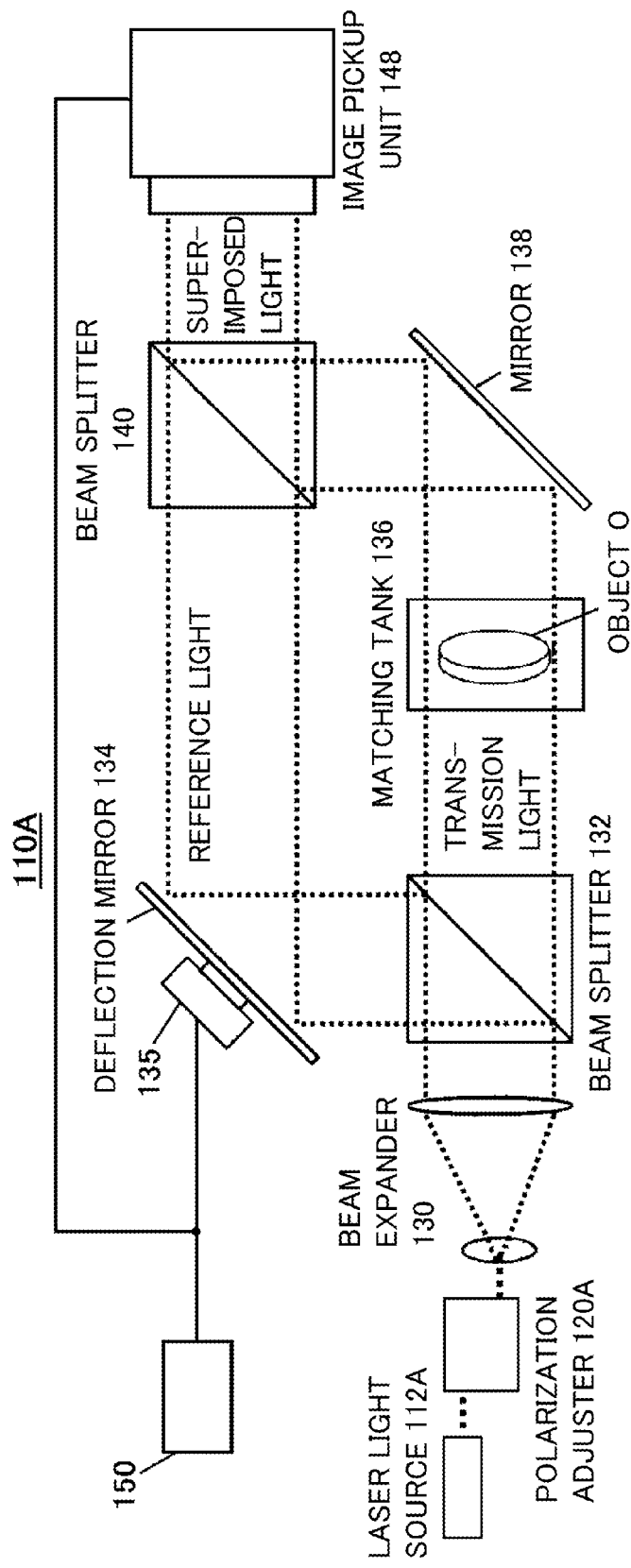
FIG. 2 is a block diagram of an interferometer of the first embodiment.

FIG. 2 is a block diagram of the interferometer 110A according to a first embodiment. The interferometer 110A is a two-beam interferometer configured to split coherent light into interference light and test light, and to enable an operator to observe the interference pattern made by an interference between the test light that has transmitted the test object O and the reference light. The interferometer 110A includes, as illustrated in FIG. 2, along an optical path, a laser light source 112A, a polarization adjuster 120A, a beam expander 130, and a beam splitter 132 in this order.

The laser light source emits 45° linearly polarized light as the coherent light.

The polarization adjuster 120A adjusts a polarization plane of the coherent light, and generates the illumination light having at least three types of polarization planes (polarization states). It is conceivable that an example of the polarization adjuster 120A uses a method of switching a plurality of different coherent beams having different polarization states and of synthesizing them.

Figure 3:
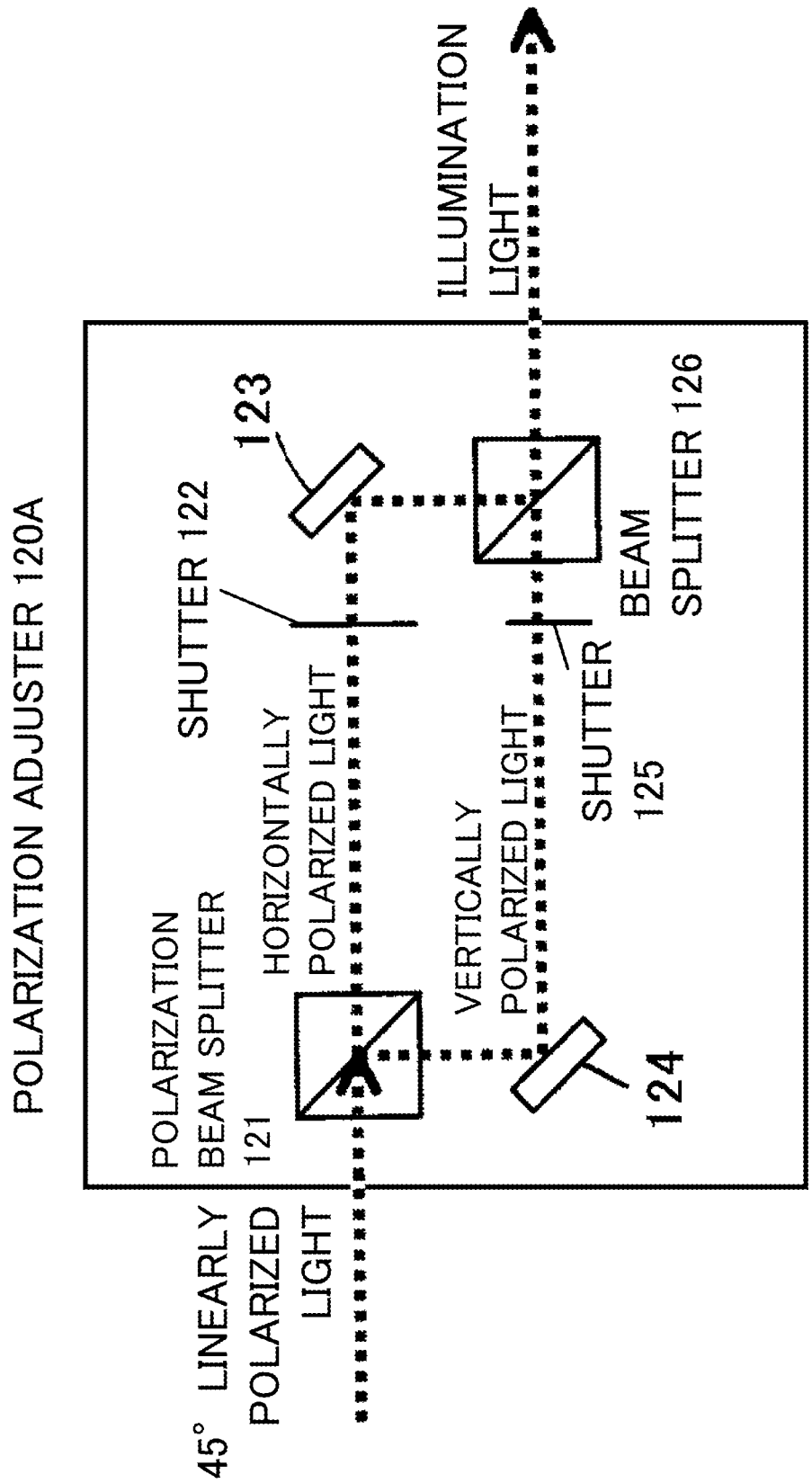
FIG. 3 is a block diagram of a polarization adjuster shown in FIG. 2.

FIG. 3 is a block diagram of one example of the polarization adjuster 120A. The polarization adjuster 120A includes a polarization beam splitter ("PBS") 121 configured to split (separate) the 45° linearly polarized light from the laser light source 112A into horizontally polarized light and vertically polarized light, a shutter 122 arranged on an optical path of the horizontally polarized light, deflection mirrors 123 and 124 configured to deflect a luminous flux by 90°, a shutter 125 arranged on an optical path of the vertically polarized light, and a beam splitter 126 configured to synthesize the horizontally polarized light and the vertically polarized light with each other.

When the shutter 122 is opened and the shutter 125 is closed, the horizontally polarized light is output as the illumination light from the polarization adjuster 120A, and when the shutter 122 is closed and the shutter 125 is opened, the vertically polarized light is output as the illumination light from the polarization adjuster 120A. An optical path of the horizontally polarized light is made identical to that of the vertically polarized light. When both shutters 122 and 125 are opened, the 45° linearly polarized light is output from the polarization adjuster 120A.

Turning back to FIG. 2, the beam expander 130 is configured to expand the luminous flux diameter of the laser beam. The beam splitter 132 splits (separates) the coherent light into the reference light and the test light.

A deflection mirror (piezoelectric mirror) 134 is arranged behind the beam splitter 132 on the optical path of the reference light reflected by the beam splitter 132. The deflection mirror 134 is configured to deflect the luminous flux and serves as a phase shifter that is configured to shift a phase of the reference light by changing the optical path length of the reference light in the sub-wavelength order.

The deflection mirror 134 is driven by a piezoelectric element 135. The piezoelectric element 135 serves as a driving unit configured to change a phase shift amount by driving the deflection mirror 134, and its driving amount is controlled by an instruction of the CPU 150. Here, a driving unit configured to drive the deflection mirror 120 is not limited to the piezoelectric element.

On an optical path of the test light that has transmitted the beam splitter 132, a matching tank 136 configured to accommodate the test object O and matching solution, and a deflection mirror 138 configured to deflect the light are arranged in this order behind the beam splitter 132. The test object is immerged in the matching solution, and the refractive index of the matching solution is almost equal to the refractive index of the test object O.

The reference light from the deflection mirror 124 and the test light from the test object O are superimposed on the beam splitter 140. An image pickup unit 148 is arranged behind the beam splitter 140 along the optical path. The image pickup unit 148 takes an interference pattern image formed by the superimposed light.

In operation, linearly polarized light of a laser beam (coherent light) emitted from the laser light source 112A is converted into a luminous flux having a polarization state set by the polarization adjuster 120A. Thereafter, the luminous flux is expanded by the beam expander 130 up to a diameter that can contain the test object O, and enters the beam splitter 132.

The beam splitter 132 splits the illumination light into transmission light that goes to the test object O and the reference light that goes to the image pickup unit 148 without transmitting the test object O. The transmission light split by the beam splitter 132 transmits through the matching tank 136 that houses the test object O and enters the beam splitter 140 via the deflection mirror 138. The reference light split by the beam splitter 132 is reflected on the deflection mirror 134 without intervening (or transmitting) the test object O and enters the beam splitter 140.

The transmission light and the reference light incident upon the beam splitter 140 are superimposed. The superimposed laser beam enters the image pickup unit 148. The image pickup unit 148 records or takes an interference pattern image that is an image according to the sectional intensity of the incident light.

The CPU 150 drives the deflection mirror 134 (piezoelectric element 135) relative to one polarization plane $R_i$ of the illumination light as the linearly polarized light realized by the polarization adjuster 120A, and enables the image pickup unit 148 to takes an image of the interference pattern of a plurality of phase shift states (reference light phases $\theta_{ij}$). Thereafter, the CPU 150 controls the polarization adjuster 120A and changes the polarization state.

A pair of transparent plates are arranged in parallel at light incident and exit portions of the matching tank 136. Since the inside of the matching tank 136 is filled with the matching solution that has almost equal refractive index as that of the test object O, the transmission light transmits the matching tank 136 with few refractions.

Since the test object O has a nonpolarization aberration or a polarization aberration, a wavefront of the light that exits from the matching tank 136 disturbs. When the transmission light having this disturbance is superimposed with the reference light, an interference pattern corresponding to the sectional intensity of the superimposed light, which is, in turn, taken by the image pickup unit 148. The taken image is output as interference pattern image data to the signal processing unit 160.

When the test object O is a plane-parallel plate with no refractions due to its shaping, the test object O may be directly arranged on an optical path of the transmission light.

The signal processing unit 160 generates as aberrational data the nonpolarization aberration and the polarization aberration of the test object O based on the interference pattern image data measured by the interferometer 110A.

The recording unit 180 stores the aberrational data generated by the signal processing unit 160. The stored aberrational data can be utilized for an optical design, a molding evaluation, etc. The display unit 182 displays the nonpolarization aberration generated by the signal processing unit 160.

The number of reference light phases is arbitrary for one polarization plane $R_i$ of the illumination light, and this embodiment takes images at three reference light phases $\{\theta_{i1}, \theta_{i2}, \theta_{i3}\} \equiv \{0, 2\pi/3, -2\pi/3\}$ for any rotational positions.

When images are taken at three reference light phases for one polarization plane $R_i$, the CPU 150 controls the polarization adjuster 120A, sets another polarization plane $R_{i+1}$ to the illumination light, and takes images at three reference light phases similarly. The number of polarization planes is arbitrary, and this embodiment takes nine interference pattern images at three reference light phases $\{R_1, R_2, R_3\} \equiv \{0, 45°, 90°\}$ for any rotational positions.

The taken interference pattern image F can be expressed as $F_{ij}(R_i, \theta_{ij}, x, y)$ utilizing the polarization plane $R_i$, the reference light phase $\theta_{ij}$, and a position coordinate (x, y) of the image plane.

The signal processing unit 160 obtains the interference pattern image $F_{ij}(R_i, \theta_{ij}, x, y)$ from the interferometer 110A, and calculates the polarization aberration and nonpolarization aberration ω(x, y) corresponding to the position (x, y) on the image plane.

Figure 4:
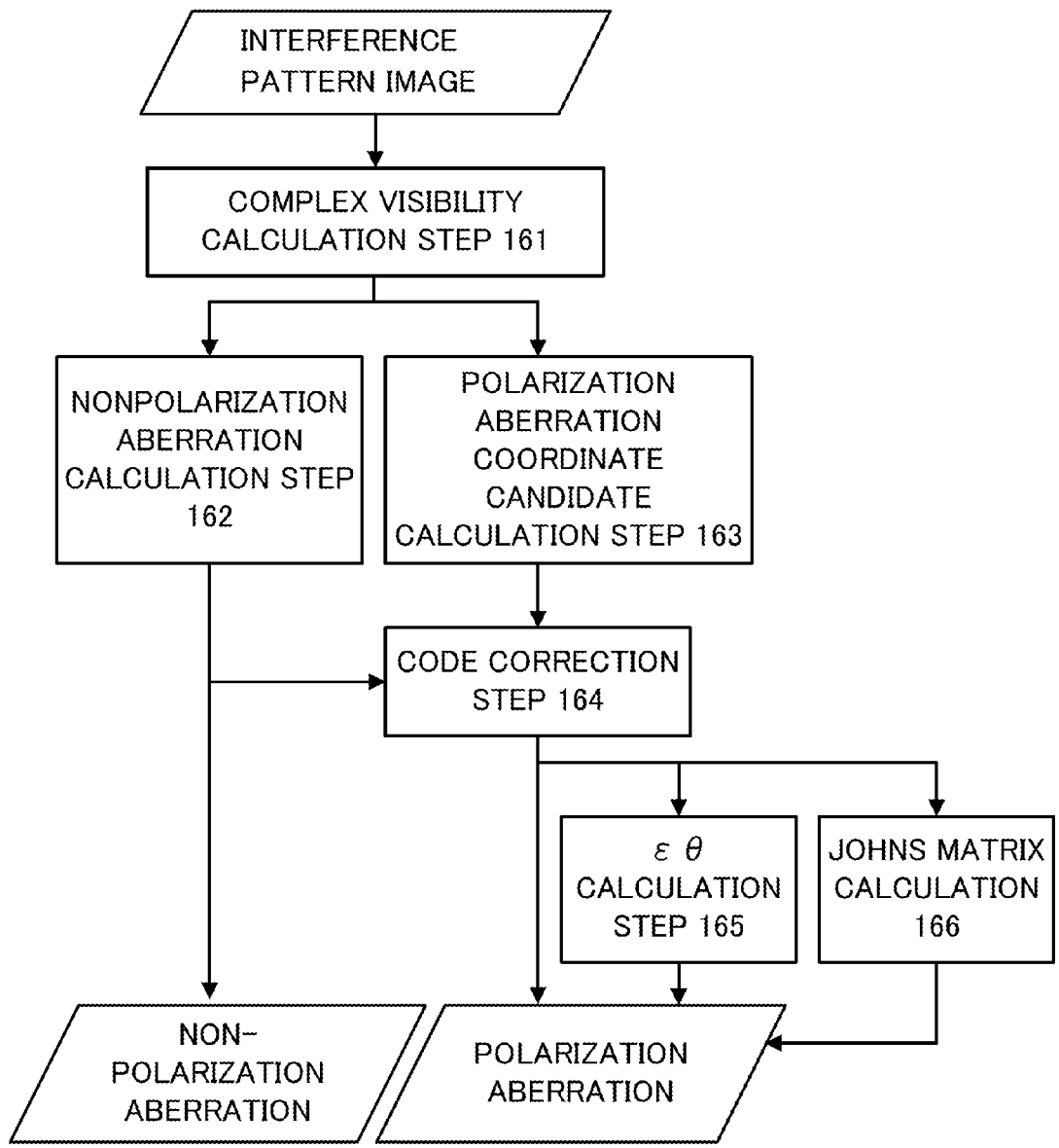
FIG. 4 is a flowchart of a process performed by a signal processing unit according to the first embodiment.

FIG. 4 is a flowchart illustrating a process performed by the signal processing unit 160 according to the first embodiment. This process includes a complex visibility calculation step 161, a nonpolarization aberration calculation step 162, a polarization aberration coordinate candidate calculation step 163, a sign correcting step 164, an εθ calculation step 165, and a Jones matrix calculation step 166.

Each step is executed by a computer program (image processing program). When each step is regarded as a module (section), the signal processing unit 160 serves as an image processor including these sections. This is also true of FIG. 7.

Initially, a group of interference pattern images $\{F_{i1}, F_{i2}, F_{i3}\}$ are taken out which have different reference light phases $\{\theta_{i1}, \theta_{i2}, \theta_{i3}\}$ on each polarization plane $R_i$. In the complex visibility calculating step 161, Equation 1 is solved from the one group of images, and complex visibilities $Q_i$ are produced from Equations 2 and 3:

$$\begin{pmatrix} \langle F_i \rangle \\ Q_i \langle F_i \rangle \end{pmatrix} = \begin{pmatrix} 1 & \exp(i\theta_{i1}) \\ 1 & \exp(i\theta_{i2}) \\ 1 & \exp(i\theta_{i3}) \end{pmatrix}^{-1} \begin{pmatrix} F_{i1} \\ F_{i2} \\ F_{i3} \end{pmatrix} \quad \text{EQUATION 1}$$

$$\langle F_i \rangle = (F_{i1} + F_{i2} + F_{i3})/3 \quad \text{EQUATION 2}$$

$$Q_i(x, y) = \frac{2F_{i1} - (1+\sqrt{3}\,i)F_{i2} - (1-\sqrt{3}\,i)F_{i3}}{6\langle F_i \rangle} \quad \text{EQUATION 3}$$

A symbol "i" in Equations 1 to 3 denotes a complex unit, and $Q_i$ denotes a complex image. A phase angle denotes a phase value of a transmission wavefront, and an absolute value denotes a value indicating an interference contrast (visibility). A matrix in Equation 1 is not a regular matrix, but a −1 power denotes a pseudo-reverse matrix. This applies to the subsequent Equations. The taken images $\{F_{i1}, F_{i2}, F_{i3}\}$ become unnecessary by performing this process whenever an image pickup set of the illumination light is processed, and the memory can be used to record taken images $\{F_{i+11}, F_{i+12}, F_{i+13}\}$ of the next illumination light.

While this embodiment utilizes three types of reference light phases for each illumination light polarization, the precision of the complex visibility can be improved by increasing the number of reference light phases. In that case, Equation 1 is expanded in the row direction. The reference light phase or the number of reference light phases may differ according to the illumination light polarization.

When the test object O has birefringence, its transmission wavefront depends upon the polarization plane and the wavefront advances when the fast axis accords with the polarization plane and delays when the slow axis accords with the polarization plane. For example, when the test object O is a half waveplate having retardation of half a wavelength and the fast axis shifts from the polarization plate by 45°, the polarization plane of the transmission light that has transmitted through the test object O changes from that of the illumination light by 90° and does not interfere with the reference light. In this case, $F_1=F_2=F_3$ is established and the visibility becomes 0, and thus the phase angle cannot be defined.

Accordingly, this embodiment calculates the nonpolarization aberration and the polarization aberration by utilizing $Q_i=\{Q_1, Q_2, Q_3\}$ measured by a plurality of polarization planes $R_i$. The following variable P, coefficients a, b, c, θ, ε, and J representative of the polarization aberration are distributions expressed by a function of an image plane (x, y) similar to $Q_i$ and ω, and indicates an operation at the same image position unless otherwise specified.

The nonpolarization aberration calculation step 162 calculates Equation 4:

$$P = \left( \begin{pmatrix} 1 & i\cos 2R_1 & i\sin 2R_1 \\ 1 & i\cos 2R_2 & i\sin 2R_2 \\ 1 & i\cos 2R_3 & i\sin 2R_3 \end{pmatrix}^{-1} \begin{pmatrix} Q_1 \\ Q_2 \\ Q_3 \end{pmatrix} \right)^2 \quad \text{EQUATION 4}$$

$$= \frac{1}{4}(-Q_1^2 - (-2Q_2 + Q_3)^2 + 2Q_1(2Q_2 + Q_3))$$

When ω is a nonpolarization aberration to be found, a phase angle (P) corresponds to 2ω. P has a constant absolute value for the test object O having any fast axis directions and retardations, and the phase angle can be defined. The nonpolarization aberration can be obtained by connecting (unwrapping) a phase angle (P) in the image plane and multiplying it by ½.

While this embodiment utilizes three types of illumination light polarizations, the precision of the nonpolarization aberration and the polarization aberration can be improved by increasing the illumination light polarizations utilizing the polarization switch of a second embodiment. In that case, Equations 4 and 5 are expanded in the row direction.

When the retardation of the test object O is small, the nonpolarization aberration may be obtained from an average (angle $Q_1$+angle $Q_3$) of the wavefronts or the phase angle ($Q_1+Q_3$) of a sum of the complex visibility with only two orthogonal polarization planes $\{R_1, R_3\}=\{0, 90°\}$.

On the other hand, when the test object O has a retardation larger than half a wavelength, the angle $Q_1$ and the angle $Q_3$ in the former does not have a contour structure but has a swirl or branching structure and thus unwrapping is unavailable. In the latter, a phase cannot be calculated in a region in which the retardation is half a wavelength because the absolute value of phase angle $(Q_1+Q_3)$ becomes 0. However, these approaches may be supplementally utilized because the high precision may be expected for the angle (P) in the region where the retardation is small.

In order to calculate the polarization aberration, the polarization aberration coordinate candidate calculation step 163 initially calculates as follows:

$$\begin{pmatrix} e^{i\omega}c \\ e^{i\omega}a \\ e^{i\omega}b \end{pmatrix} = \begin{pmatrix} 1 & i\cos 2R_1 & i\sin 2R_1 \\ 1 & i\cos 2R_2 & i\sin 2R_2 \\ 1 & i\cos 2R_3 & i\sin 2R_3 \end{pmatrix}^{-1} \begin{pmatrix} Q_1 \\ Q_2 \\ Q_3 \end{pmatrix} \quad \text{EQUATION 5}$$

As a result, Equations 6-8 are obtained:

$$e^{i\omega}a = -\frac{i}{2}(Q_1 - Q_3) \quad \text{EQUATION 6}$$

$$e^{i\omega}b = -\frac{i}{2}(Q_1 - 2Q_2 + Q_3) \quad \text{EQUATION 7}$$

$$e^{i\omega}c = \frac{1}{2}(Q_1 + Q_3) \quad \text{EQUATION 8}$$

While $\{a, b, c\}$ are coefficients (real numbers) relating to the polarization aberration, their signs cannot be determined at this stage because is unknown.

Accordingly, the sign correction step 164 determines $\{a, b, c\}$ from $\{e^{i\omega}a, e^{i\omega}b, e^{i\omega}c\}$ obtained from the polarization aberration coordinate candidate calculation step 163 utilizing the value of ω obtained in the nonpolarization aberration calculation step 162 as follows:

$$a = e^{i\omega}a/e^{i\omega} \quad \text{EQUATION 9}$$

$$b = e^{i\omega}b/e^{i\omega} \quad \text{EQUATION 10}$$

$$c = e^{i\omega}c/e^{i\omega} \quad \text{EQUATION 11}$$

In this calculations, $\{a, b, c\}$ may cause an imaginary term due to the measurement errors according to calculations. In that case, the imaginary term is discarded to produce a real number. $\{a, b, c\}$ indicates the polarization aberration.

Figure 5:
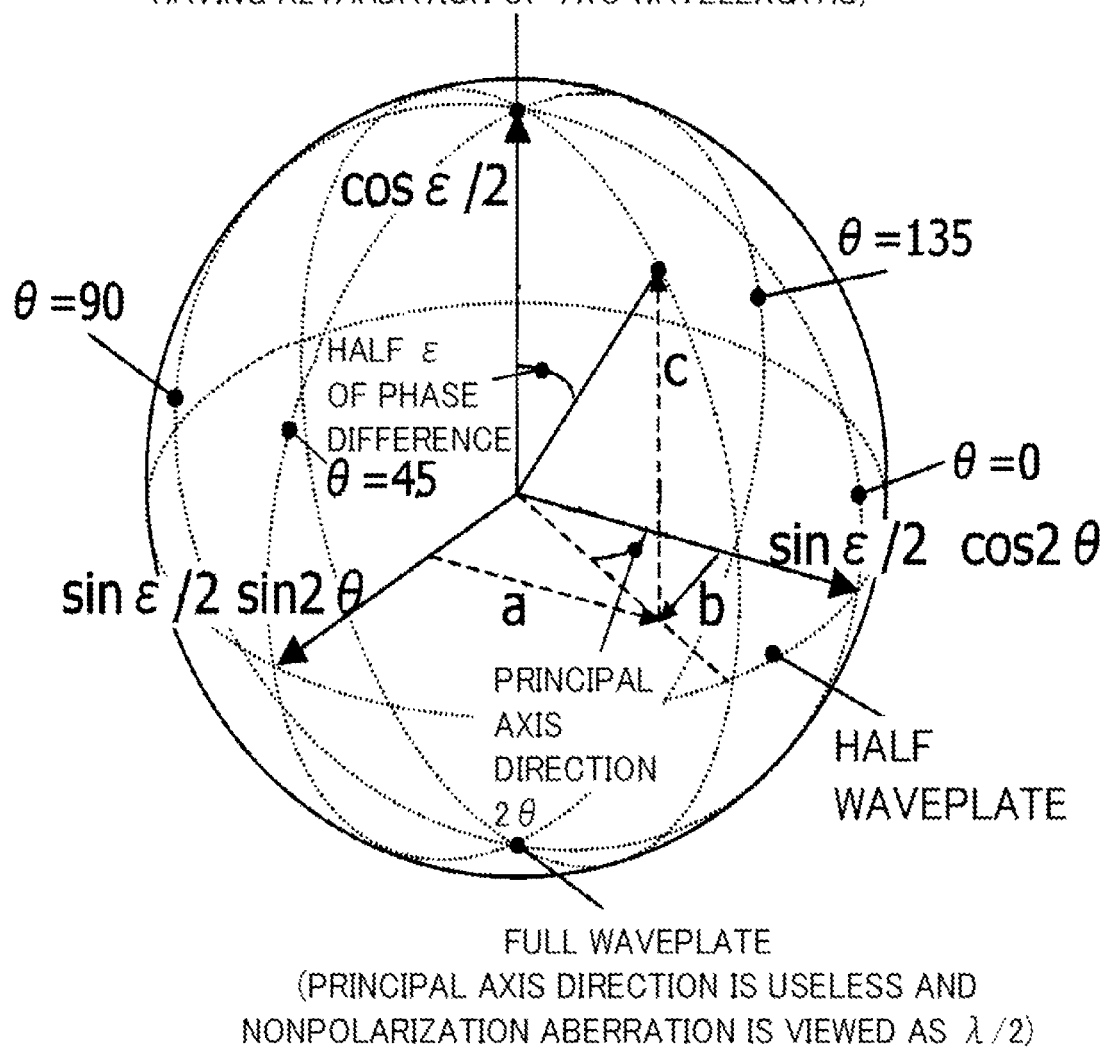
FIG. 5 is a diagram illustrating a spherical expression illustration of a polarization aberration.

FIG. 5 is a display illustration of the polarization aberration. As illustrated in FIG. 5, the display unit 182 displays $\{a, b, c\}$ on the three-dimensional orthogonal coordinate system in which the coefficients a, b, and c correspond to respective axes. Thereby, an operator can visually understand the influence of the polarization aberration. In this three-dimensional orthogonal coordinate space, every retardation and the $\{a, b, c\}$ coordinate set of the polarization aberration in the fast axis form a spherical surface.

In general, the polarization aberration is expressed by a retardation amount $2\epsilon$ and a principal axis direction θ. However, this expression has a variety of problems. One problem is a definition region: In general, $0 \le \epsilon$ and $0 \le \theta < 180°$ are set but $0 \le \theta < 90°$ is enough when negative $\epsilon$ is considered. When $\epsilon=0$, θ cannot be defined. In addition, when $\epsilon$ is small, an error of θ in the measurement is likely to increase and a quantitative evaluation of the error becomes difficult.

On the other hand, when the coefficients a, b, and c are used, a constant error is expressed for any polarization aberrations. $\{a, b, c\}$ and $\{\epsilon, \theta\}$ satisfy the following relationship: $a = \sin\epsilon\cos 2\theta$, $b = \sin\epsilon\sin 2\theta$ and $c = \cos\epsilon$ (therefore, $a^2 + b^2 + c^2 = 1$).

As long as the influence to the transmission wavelength is considered with a single wavelength, the polarization states are identical between the incident wave and the transmission wave irrespective of the fast axis direction in a full waveplate having a retardation of one wavelength. In that case, a phase of the transmission wave inverts. Moreover, the polarization states are identical between the incident wave and the transmission wave in a full waveplate having a retardation of two wavelengths, similar to the nonpolarization plate, and no phase inversion occurs.

When $\{a, b, c\}$ is expressed on a spherical surface, the polarization aberration that has the same influence on the transmission wave is expressed at the same position. Positions on the spherical surface for two different polarization aberrations are separated according to a difference of the influence on the transmission wave. Two polarization aberrations that are symmetrical with respect to the origin as a center of the sphere have the same polarization state of the transmission wave but their phases are inverted.

When the expression of $\{\epsilon, \theta\}$ is necessary rather than the expression of $\{a, b, c\}$, the εθ calculation step 165 converts $\{a, b, c\}$ into $\{\epsilon, \theta\}$ as follows:

$$\theta = a\tan 2(a, b) \quad \text{EQUATION 12}$$

$$\epsilon' = a\tan 2(\sqrt{a^2 + b^2}, c) \quad \text{EQUATION 13}$$

Since $\epsilon'$ is a fold of $\epsilon$ onto $[0, \pi]$, $\epsilon$ is obtained by unwrapping $\epsilon'$ utilizing the continuousness in the image.

When it is necessary to express the polarization aberration utilizing the Jones matrix, the Jones matrix calculation step 166 calculates the Jones matrix J from $\{a, b, c\}$ as follows:

$$J = \begin{pmatrix} c + ia & ib \\ ib & c - ia \end{pmatrix} \quad \text{EQUATION 14}$$

When the nonpolarization aberration is considered, the following equation is calculated utilizing ω:

$$J = e^{i\omega}\begin{pmatrix} c + ia & ib \\ ib & c - ia \end{pmatrix} \quad \text{EQUATION 15}$$

$$= \begin{pmatrix} e^{i\omega}c + ie^{i\omega}a & ie^{i\omega}b \\ ie^{i\omega}b & e^{i\omega}c - ie^{i\omega}a \end{pmatrix}$$

The polarization of the transmission light can be predicted when a variety of polarization beams are introduced into the test object O by utilizing the Jones matrix. The following equation is met where $\{S_1, S_2, S_3\}$ denotes Stokes parameters of the incident light and $\{S_1', S_2', S_3'\}$ denotes Stokes parameters of the transmission light:

$$\begin{pmatrix} iS_1' & S_3' + iS_2' \\ -S_3' + S_2' & -iS_1' \end{pmatrix} = \begin{pmatrix} c + ia & ib \\ ib & c - ia \end{pmatrix}^{-1} \quad \text{EQUATION 16}$$

$$\begin{pmatrix} iS_1 & S_3 + iS_2 \\ -S_3 + S_2 & -iS_1 \end{pmatrix}\begin{pmatrix} c + ia & ib \\ ib & c - ia \end{pmatrix}$$

While the signal processing unit 160 obtains three formats including the $\{a, b, c\}$ format, the $\{\epsilon, \theta\}$ format, and the Jones matrix format, the recording unit 180 records one or more formats if necessary.

This embodiment can obtain polarization and nonpolarization aberrations with a predetermined precision for the test object O having an arbitrary principal axis direction and an arbitrary retardation amount. In addition, the operator can quantitatively understand the influence of the polarization aberration when the display unit 182 displays the polarization aberration.

The interferometer 110A may use a heterodyne method with a modulation unit (not illustrated) configured to drive a deflection mirror 134. A plurality of interference patterns modulated by the modulation unit are taken, and a phase difference can be calculated from an intensity change of the interference pattern. The modulation unit drives the deflection mirror 134 so as to vary a movement amount of the deflection mirror 134 with time like a saw tooth shape.

In this case, the CPU 150 drives the deflection mirror 134 through the modulation unit for one polarization plane $R_i$ like the saw tooth shape, and takes an interference pattern through the image pickup unit 148 at a plurality of reference light phases $\theta_{ij}$ while the deflection mirror 134 is linearly moved by one or more wavelengths of a laser beam.

When the image pickup ends with n reference light phases for a predetermined polarization plane $R_i$, the CPU 150 controls the polarization adjuster 120A, sets another polarization plane $R_{i+1}$ for the illumination light, and takes images with n reference light phases similarly.

A group of interference pattern images $\{F_{i1}, F_{i2}, F_{i3}, \ldots, F_{in}\}$ having different reference light phases $\{\theta_{i1}, \theta_{i2}, \theta_{i3}, \ldots, \theta_{in}\}$ are taken for each polarization plane $R_i$. The complex visibility calculation step 161 solves the group of interference pattern images utilizing the following equations and generates the complex visibility $Q_i$.

$$\begin{pmatrix} \langle F_i \rangle \\ Q_i \langle F_i \rangle \end{pmatrix} = \begin{pmatrix} 1 & \exp(i\theta_{i1}) \\ 1 & \exp(i\theta_{i2}) \\ 1 & \exp(i\theta_{i3}) \\ \vdots & \vdots \\ 1 & \exp(i\theta_{in}) \end{pmatrix}^{-1} \begin{pmatrix} F_{i1} \\ F_{i2} \\ F_{i3} \\ \vdots \\ F_{in} \end{pmatrix} \quad \text{EQUATION 17}$$

The process flow is similar to that described with reference to FIG. 4.

Second Embodiment

FIG. 5 is a block diagram of an interferometer 110B of a second embodiment, and those elements in FIG. 5 which are corresponding elements in FIG. 2 are designated by the same reference numerals. The interferometer 110B is a shearing interferometer configured to enable an operator to observe an interference pattern that is made by making coherent light that has transmitted a test object and coherent light having a shifted phase interfere with each other. The interferometer 110B includes in order along an optical path a laser light source 112B, a polarization adjuster 120B, a beam expander 130, a matching tank 136, a shear mirror 142, and an image pickup unit 148.

The laser light source 112B and the polarization adjuster 120B may be comprised by the laser light source 112A and the polarization adjuster 120A, but may use different structures so as to realize more polarization planes of the illumination light. For example, the laser light source 112B may emit a laser beam of a circular polarized light, and the polarization adjuster 120B may utilize a rotatable polarizer or quarter waveplate. The illumination light of linearly polarized light having an arbitrary polarization plane can be generated by rotating the polarizer or the quarter waveplate. The laser light source 112B may emit a laser beam of linearly polarized light like the laser light source 112A, and the polarization adjuster 120B may utilize a rotatable half waveplate. The illumination light of linearly polarized light having an arbitrary polarization plane can be generated by rotating the half waveplate.

The shear mirror 142 includes a semi-reflection surface 142a and a total reflection surface 142b that are spaced in parallel by a predetermined interval. The shear mirror 142 serves as a phase shifter configured to shift a phase of the coherent light.

The light that has transmitted the test object O and entered the shear mirror 142 is divided into a luminous flux reflected on the semi-reflection surface 142a and a luminous flux reflected on the total reflection surface 142b, and these luminous fluxes are superimposed and exit while the shift between them is maintained. In this embodiment, this shift amount is a shear width D and a shear direction is an x-axis direction of an image.

A fine movement unit 144 is configured to move the total reflection surface 142b close to and away from the semi-reflection surface 142a while maintaining the semi-reflection surface 142a and the total reflection surface 142b parallel to each other. The shear width D can be adjusted when the fine movement unit 144 moves the total reflection surface 142b.

The superimposed light emitted from the shear mirror 142 forms an interference pattern and is taken by the image pickup unit 148.

In the interference pattern measurement, while the test object O is housed in the matching tank 136, the polarization adjuster 120B and the fine movement unit 144 are driven and an interference pattern is taken by the image pickup unit 148 with a predetermined illumination light polarization plane $R_i$ and a predetermined shear width $D_{ij}$.

This embodiment sets the same shear widths $\{D_{i1}, D_{i2}, D_{i3}, D_{i4}\} = \{D, D+\lambda/4, D+\lambda/2, D+3\lambda/4\}$ for four types of polarization planes $\{R_1, R_2, R_3, R_4\} = \{0°, 45°, 90°, 135°\}$. $\lambda$ denotes a wavelength of the illumination light and $D \gg \lambda$ is assumed.

Since an optical path length of the luminous flux reflected by the total reflection surface 142b varies according to a shear amount, phase shifts of $\{\theta_{i1}, \theta_{i2}, \theta_{i3}, \theta_{i4}\} = \{0, \pi/2, \pi, 3\pi/2\}$ occur for $\{D_{i1}, D_{i2}, D_{i3}, D_{i4}\}$. Thus, sixteen interference pattern images $F_{ij}(R_i, D_{ij}, x, y)$ are taken and input into the signal processing unit 160.

The signal processing unit 160 obtains the interference pattern images $F_{ij}(R_i, D_{ij}, x, y)$ from the interferometer 110B, and calculates the polarization and nonpolarization aberrations $\omega(x, y)$ on the test object corresponding to the position (x, y) of the image plane.

Figure 7:
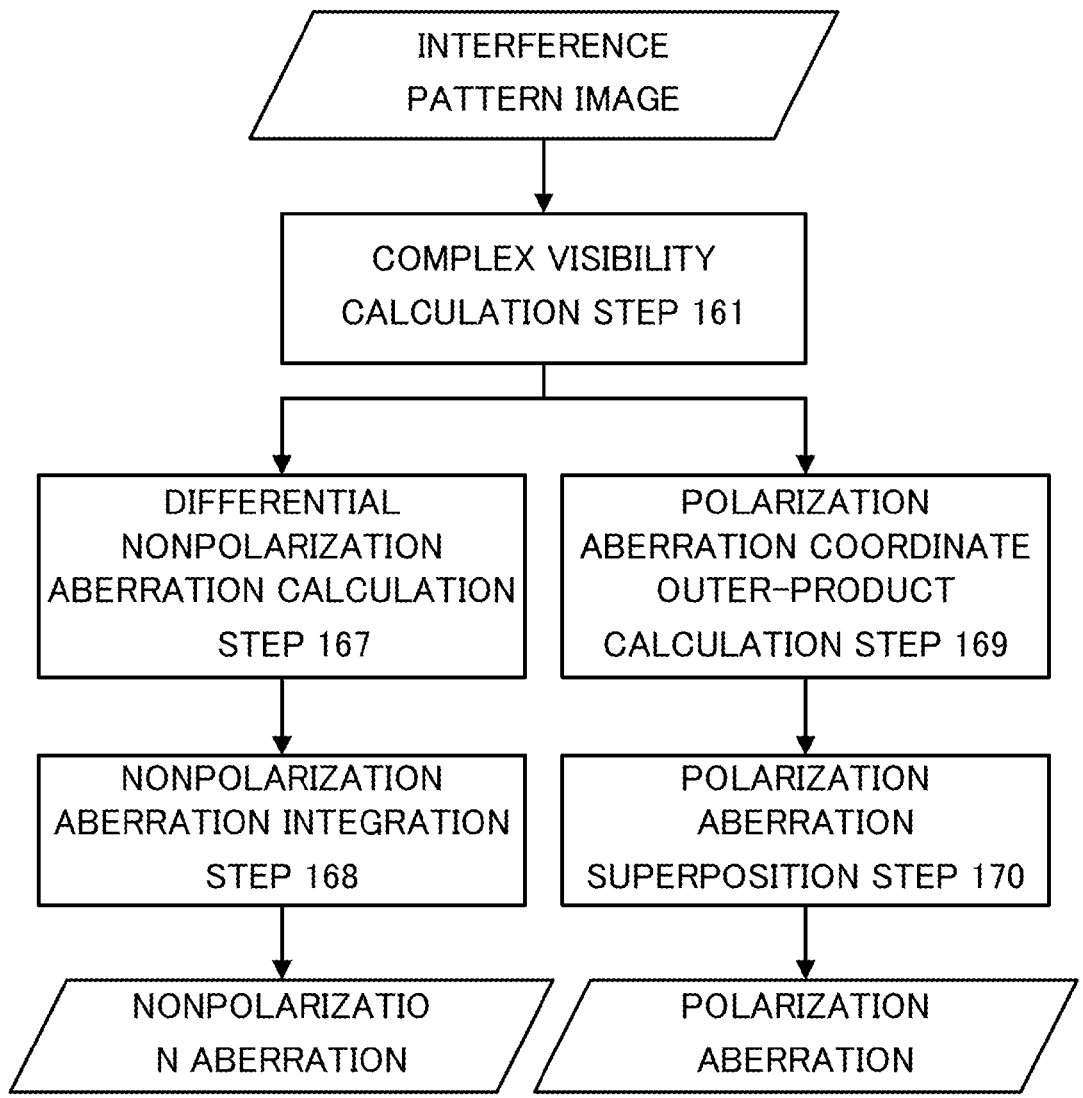
FIG. 7 is a flowchart of a process performed by a signal processing unit according to the second embodiment.

FIG. 7 is a flowchart illustrating a process of the signal processing unit 160 according to the second embodiment. This process includes a complex visibility calculation step 161, a differential nonpolarization aberration calculation step 167, a nonpolarization aberration integration step 168, a polarization aberration coordinate outer-product calculation step 169, and a polarization aberration superposition step 170.

Initially, a group of interference pattern images ($F_{i1}$, $F_{i2}$, $F_{i3}$, $F_{i4}$) having different shear amounts $\{D_{i1}, D_{i2}, D_{i3}, D_{i4}\}$ are taken out for each polarization plane $R_i$. The complex visibility calculation step 161 solves the following equation utilizing the group of images, and generates the complex visibilities $Q_i$ utilizing Equations 19 and 20:

$$\begin{pmatrix} \langle F_i \rangle \\ Q_i \langle F_i \rangle \end{pmatrix} = \begin{pmatrix} 1 & \exp(i\theta_{i1}) \\ 1 & \exp(i\theta_{i2}) \\ 1 & \exp(i\theta_{i3}) \\ 1 & \exp(i\theta_{i4}) \end{pmatrix}^{-1} \begin{pmatrix} F_{i1} \\ F_{i2} \\ F_{i3} \\ F_{i4} \end{pmatrix} \quad \text{EQUATION 18}$$

$$\langle F_i \rangle = (F_{i1} + F_{i2} + F_{i3} + F_{i4})/4 \quad \text{EQUATION 19}$$

$$Q_i(x, y) = \frac{F_{i1} - iF_{i2} - F_{i3} + iF_{i4}}{4\langle F_i \rangle} \quad \text{EQUATION 20}$$

The differential nonpolarization aberration calculation step 167 calculates the following equations utilizing the complex visibility $\{Q_1, Q_2, Q_3, Q_4\}$ for each polarization plane $\{R_1, R_2, R_3, R_4\}$ calculated by the complex visibility calculation step 161:

$$P = \left| \begin{pmatrix} 1 & i\cos 2R_1 & i\sin 2R_1 \\ 1 & i\cos 2R_2 & i\sin 2R_2 \\ 1 & i\cos 2R_3 & i\sin 2R_3 \\ 1 & i\cos 2R_3 & i\sin 2R_3 \end{pmatrix}^{-1} \begin{pmatrix} Q_1 \\ Q_2 \\ Q_3 \\ Q_4 \end{pmatrix} \right|^2 \quad \text{EQUATION 21}$$

$$= \frac{1}{16}(Q_1 + Q_2 + Q_3 + Q_4)^2 - \frac{1}{4}(Q_1 - Q_3)^2 - \frac{1}{4}(Q_2 - Q_4)^2$$

a differential nonpolarization aberration between two points, which is $\Delta\omega \equiv \omega a - \omega = \text{angle}(P)/2$ between the nonpolarization aberrations $\omega$ and $\omega a$ is obtained by finding the phase angle (P) and multiplying the phase angle (P) by ½.

When the nonpolarization aberration $\omega$ of the test object O is continuous, $\Delta\omega$ can be obtained from the following equation by making small the shear width D. Thereby, unwrapping of the differential nonpolarization aberration $\Delta\omega$ is unnecessary. In this case, a difference of the polarization aberration between two sheared points can be considered sufficiently small, and $\Delta\omega$ may be set to an angle $(Q_1+Q_2+Q_3+Q_4)$.

$$|\Delta\omega| = \left| D\frac{d\omega}{dx} \right| < \prod /4 \quad \text{EQUATION 22}$$

Next, the nonpolarization aberration integration step 168 integrates the differential nonpolarization aberration $\Delta\omega$ and obtains the nonpolarization aberration $\omega$. This is generally performed by the conventional shearing interferometric analysis utilizing the following equation, where $\omega(0, y)$ is measured by another measurement unit.

$$\omega(x, y) = \omega(0, y) + \int_0^x \frac{\Delta\omega}{D} dx \quad \text{EQUATION 23}$$

On the other hand, the polarization aberration coordinate outer-product calculation step 169 finds a value corresponding to a difference of the polarization aberration. In the shearing interferometry, a difference of the nonpolarization aberration is found as $\Delta\omega \equiv \omega' - \omega$, whereas a difference of the polarization aberration is found as the following outer product:

$$\begin{pmatrix} bc' - b'c \\ ca' - c'a \\ ab' - b'a \end{pmatrix} \equiv \begin{pmatrix} a \\ b \\ c \end{pmatrix} \times \begin{pmatrix} a' \\ b' \\ c' \end{pmatrix} \quad \text{EQUATION 24}$$

In this case, $\{e^{i\Delta\omega}\Delta a, e^{i\Delta\omega}\Delta b, e^{i\Delta\omega}\langle Q\rangle\}$ is calculated utilizing Equation 25, and Equations 26-28 are obtained:

$$\begin{pmatrix} e^{i\Delta\omega}\langle Q\rangle \\ e^{i\Delta\omega}\Delta a \\ e^{i\Delta\omega}\Delta b \end{pmatrix} = \begin{pmatrix} 1 & i\cos 2R_1 & i\sin 2R_1 \\ 1 & i\cos 2R_2 & i\sin 2R_2 \\ 1 & i\cos 2R_3 & i\sin 2R_3 \\ 1 & i\cos 2R_4 & i\sin 2R_4 \end{pmatrix}^{-1} \begin{pmatrix} Q_1 \\ Q_2 \\ Q_3 \\ Q_4 \end{pmatrix} \quad \text{EQUATION 25}$$

$$e^{i\Delta\omega}\Delta a = -\frac{i}{2}(Q_1 - Q_3) \quad \text{EQUATION 26}$$

$$e^{i\Delta\omega}\Delta b = -\frac{i}{2}(Q_2 - Q_4) \quad \text{EQUATION 27}$$

$$e^{i\Delta\omega}\langle Q\rangle = \frac{1}{4}(Q_1 + Q_2 + Q_3 + Q_4) \quad \text{EQUATION 28}$$

Here, $\{\Delta a, \Delta b, \langle Q\rangle\}$ are real numbers given by the following equations for the polarization aberrations $\{a, b, c\}$ and $\{a', b', c'\}$ between two points to be sheared:

$$\Delta a \equiv ac' - a'c \quad \text{EQUATION 29}$$

$$\Delta b \equiv bc' - b'c \quad \text{EQUATION 30}$$

$$\langle Q\rangle \equiv cc' + aa' + bb' = \begin{pmatrix} a \\ b \\ c \end{pmatrix} \cdot \begin{pmatrix} a' \\ b' \\ c' \end{pmatrix} \quad \text{EQUATION 31}$$

They can be found by utilizing the following equations and $\Delta\omega$ obtained in the differential nonpolarization aberration calculation step 167 as follows:

$$\Delta a = e^{i\Delta\omega}\Delta a/e^{i\Delta\omega} \quad \text{EQUATION 32}$$

$$\Delta b = e^{i\Delta\omega}\Delta b/e^{i\Delta\omega} \quad \text{EQUATION 33}$$

$$\langle Q\rangle = e^{i\Delta\omega}\langle Q\rangle/e^{i\Delta\omega} \quad \text{EQUATION 34}$$

When the shear width D is small and $|\Delta\omega| < \pi/4$ is known, an absolute value may be simply picked up and the same sign as that of the original real number component may be set. In other words, the following equations may be set:

$$\Delta a = \text{sign}(\text{real}(e^{i\Delta\omega}\Delta a))|e^{i\Delta\omega}\Delta a| \quad \text{EQUATION 35}$$

$$\Delta b = \text{sign}(\text{real}(e^{i\Delta\omega}\Delta b))|e^{i\Delta\omega}\Delta b| \quad \text{EQUATION 36}$$

$$\langle Q\rangle = \text{sign}(\text{real}(e^{i\Delta\omega}\langle Q\rangle))|e^{i\Delta\omega}\langle Q\rangle| \quad \text{EQUATION 37}$$

Here, $\Delta c \equiv ab' - b'a$ is calculated from $\Delta a$, $\Delta b$, and $\langle Q\rangle$ by utilizing the following equations. $\{\Delta a, \Delta b, \Delta c\}$ denotes an outer product between the polarization aberrations $\{a, b, c\}$ and $\{a', b', c'\}$ between two points to be sheared.

$$\langle Q\rangle 2 + \Delta a2 + \Delta b2 + \Delta c2 = (a2 + b2 + c2) \quad \text{EQUATION 38}$$
$$(a'2 + b'2 + c'2)$$
$$= 1$$

$$\begin{pmatrix} \Delta b \\ -\Delta a \\ \Delta c \end{pmatrix} \equiv \begin{pmatrix} a \\ b \\ c \end{pmatrix} \times \begin{pmatrix} a' \\ b' \\ c' \end{pmatrix} \quad \text{EQUATION 39}$$

Alternatively, $\Delta c$ may be found by utilizing the following equation and complex visibilities QR and QL obtained by the interferometry of the illumination polarizations of the right circularly polarized light and left circularly polarized light, although this embodiment does not use this method:

$$ei\Delta\omega\Delta a = -\frac{i}{2}(QR - QL) \qquad \text{EQUATION 40}$$

Next, the polarization aberration superposition step 170 obtains the polarization aberration {a, b, c} of the test object by utilizing {Δa, Δb, Δc, <Q>} obtained in the polarization aberration coordinate outer-product calculation step 169. This corresponds to an integration of the nonpolarization aberration. It is optional to obtain all of {Δa, Δb, Δc, <Q>} from the polarization aberration coordinate outer-product calculation step 169, because a relationship of <Q>2+Δa2+Δb2+Δc2=1 may be utilized:

EQUATION 41

$$\begin{pmatrix} ia(x,y) & c(x,y)+ib(x,y) \\ -c(x,y)+ib(x,y) & -ia(x,y) \end{pmatrix} =$$

$$\exp\left(\int_0^x \frac{\log\left(\cos\frac{\rho}{2}\begin{pmatrix}1 & 0\\0 & 1\end{pmatrix} + \frac{\sin\frac{\rho}{2}}{2i\sin\rho}\begin{pmatrix} i\Delta b(s,y) & \Delta c(s,y)-i\Delta a(s,y) \\ -\Delta c(s,y)-i\Delta a(s,y) & -i\Delta b(s,y) \end{pmatrix}\right)}{D} ds\right)$$

$$\begin{pmatrix} ia(y,0) & c(y,0)+ib(y,0) \\ -c(y,0)+ib(y,0) & -ia(y,0) \end{pmatrix} \exp$$

$$\left(\int_0^x \frac{-\log\left(\cos\frac{\rho}{2}\begin{pmatrix}1 & 0\\0 & 1\end{pmatrix} + \frac{\sin\frac{\rho}{2}}{2i\sin\rho}\begin{pmatrix} i\Delta b(s,y) & \Delta c(s,y)-i\Delta a(s,y) \\ -\Delta c(s,y)-i\Delta a(s,y) & -i\Delta b(s,y) \end{pmatrix}\right)}{D} ds\right) \approx$$

$$\exp\left(\frac{i}{2}\int_0^x \frac{\begin{pmatrix} i\Delta b(s,y) & \Delta c(s,y)-i\Delta a(s,y) \\ -\Delta c(s,y)-i\Delta a(s,y) & -i\Delta b(s,y) \end{pmatrix}}{D\langle Q\rangle(s,y)} ds\right) \begin{pmatrix} ia(y,0) & c(y,0)+ib(y,0) \\ -c(y,0)+ib(y,0) & -ia(y,0) \end{pmatrix}$$

$$\exp\left(-\frac{i}{2}\int_0^x \frac{\begin{pmatrix} i\Delta b(s,y) & \Delta c(s,y)-i\Delta a(s,y) \\ -\Delta c(s,y)-i\Delta a(s,y) & -i\Delta b(s,y) \end{pmatrix}}{D\langle Q\rangle(s,y)} ds\right)$$

{a(0,y),b(0,y),c(0,y)} is measured by another measurement unit. ρ is an angle that satisfies cos ρ=<Q>.

The recording unit 180 records the nonpolarization aberration ω obtained in the nonpolarization aberration integration step 168 and the polarization aberration {a, b, c} obtained by the polarization aberration superposition step 170. Similar to the first embodiment, the nonpolarization aberrations {a, b, c} may be converted into {ε, θ} or Jones matrix and recorded as that format if necessity arises.

Thereby, the nonpolarization aberration and polarization aberration can be obtained throughout the entire surface of the test object O. Since this embodiment utilizes the shearing interferometer, this embodiment can make unnecessary unwrapping by maintaining the shear width small for the test object having a large aberration. In addition, since the optical paths to be interfered are arranged close to each other in the shearing interferometer, the influence of the disturbance, such as air fluctuations, can be restrained and a highly precise measurement can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-277157, filed Dec. 7, 2009 which is hereby incorporated by reference herein in its entirety.

What is claimed is:

1. An aberration measurement system comprising:
    an interferometer that includes a polarization adjuster configured to adjust a polarization plane of coherent light, and a phase shifter configured to shift a phase of reference light, the interferometer being configured to split the coherent light into the reference light and test light and to enable an interference pattern to be observed which is obtained by an interference between the reference light and the test light that has transmitted a test object; and
    a signal processing unit configured to obtain a nonpolarization aberration of the test object, and coefficients a=sin ε cos 2θ, b=sin ε sin 2θ, and c=cos ε for a retardation amount 2ε and a principal axis direction θ of a polarization aberration of the test object, based on data of a plurality of interference pattern images which provide at least three complex visibilities obtained from the interferometer after the polarization adjuster adjusts the polarization plane of the coherent light, and to determine signs of the coefficients a, b, and c based on the nonpolarization aberration.

2. The aberration measurement system according to claim 1, further comprising a display unit configured to display the coefficients a, b, and c in an orthogonal coordinate system.

3. An aberration measurement method that utilizes an interferometer that includes a polarization adjuster configured to adjust a polarization plane of coherent light, and a phase shifter configured to shift a phase of reference light, the interferometer being configured to split the coherent light into the reference light and test light and to enable an interference pattern to be observed which is obtained by an interference between the reference light and the test light that has transmitted a test object, said aberration measurement method comprising:

providing data of a plurality of interference pattern images which provide at least three complex visibilities from the interferometer to a signal processing unit after the polarization adjuster adjusts the polarization plane of the coherent light;

obtaining via the signal processing unit a nonpolarization aberration of the test object based on the data; and obtaining via the signal processing unit coefficients $a=\sin\epsilon \cos 2\theta$, $b=\sin\epsilon \sin 2\theta$, and $c=\cos\epsilon$ for a retardation amount $2\epsilon$ and a principal axis direction $\theta$ of a polarization aberration of the test object based on the data, and to determine signs of the coefficients a, b, and c based on the nonpolarization aberration.

4. A non-transitory computer-readable storage medium storing a program executable by a computer to obtain data of a plurality of interference pattern images which provide at least three complex visibilities after a polarization adjuster adjusts a polarization plane of coherent light, from an interferometer that includes the polarization adjuster configured to adjust the polarization plane of the coherent light, and a phase shifter configured to shift a phase of reference light, the interferometer being configured to split the coherent light into the reference light and test light and to enable an interference pattern to be observed which is obtained by an interference between the reference light and the test light that has transmitted a test object, the program comprising:

obtaining a nonpolarization aberration of the test object based on the data;

obtaining based on the data coefficients $a=\sin\epsilon \cos 2\theta$, $b=\sin\epsilon \sin 2\theta$, and $c=\cos\epsilon$ for a retardation amount $2\epsilon$ and a principal axis direction $\theta$ of a polarization aberration of the test object; and determining signs of the coefficients a, b, and c based on the nonpolarization aberration.

\* \* \* \* \*